(12) United States Patent
Provitola

(10) Patent No.: US 6,419,028 B1
(45) Date of Patent: Jul. 16, 2002

(54) GROUND SURFACE CROP HARVESTER AND HARVESTING METHOD

(76) Inventor: Anthony Italo Provitola, P.O. Box 2855, DeLand, FL (US) 32721-2855

( * ) Notice: Subject to any disclaimer, the term of this patent is extended or adjusted under 35 U.S.C. 154(b) by 0 days.

(21) Appl. No.: 09/782,799

(22) Filed: Feb. 12, 2001

(51) Int. Cl.$^7$ .............................................. A01D 27/00
(52) U.S. Cl. ............................ 171/1; 171/26; 171/107
(58) Field of Search .................... 171/1, 26, 18, 171/14, 15, 19, 83, 84, 104, 105, 107, 111, 143, 144; 56/400.01, 400.15, 400.21; D8/1, 13

(56) References Cited

U.S. PATENT DOCUMENTS

| | | | | |
|---|---|---|---|---|
| 1,351,948 A | * | 9/1920 | Fowler | |
| 3,014,749 A | * | 12/1961 | Carrow | 294/26 |
| 3,458,981 A | * | 8/1969 | Banner | 56/229 |
| 3,989,110 A | * | 11/1976 | Medlock et al. | 171/28 |
| 4,753,296 A | * | 6/1988 | Kruithoff | 171/26 |
| 4,970,853 A | * | 11/1990 | Greene, III | 56/400.01 |
| 5,024,278 A | * | 6/1991 | Shuknecht | 171/17 |
| 5,027,906 A | * | 7/1991 | Jeannotte et al. | 171/86 |
| D391,133 S | * | 2/1998 | Lee | D8/13 |
| D418,726 S | * | 1/2000 | White, Jr. | D8/13 |
| 6,033,035 A | * | 3/2000 | Neumann et al. | 303/113.4 |

* cited by examiner

Primary Examiner—Christopher J. Novosad

(57) ABSTRACT

A harvester for ground surface crops is an array of bars connected to cross-members, each bar having an obtuse-angulation toward the front end of the bar. The arrays describe surfaces which may be curved or substantially planar on either side of the obtuse angle. The bars are spaced closely enough to be smaller than the size of the parts of the plants of the ground surface crop to be harvested, and spaced far enough apart to permit weeds and other debris to drop between the bars to the ground. The harvester apparatus is used by moving it forward, front end first, along the ground sufficiently into the soil surface to slip underneath the crop-parts to be gathered. As the front parts of the bars slips underneath the crop-part to be gathered, the crop-part is lifted from the soil by the forward motion of the harvester and ramped upward and rearward along the incline of the bars, and is thereby detached from the soil surface.

21 Claims, 6 Drawing Sheets

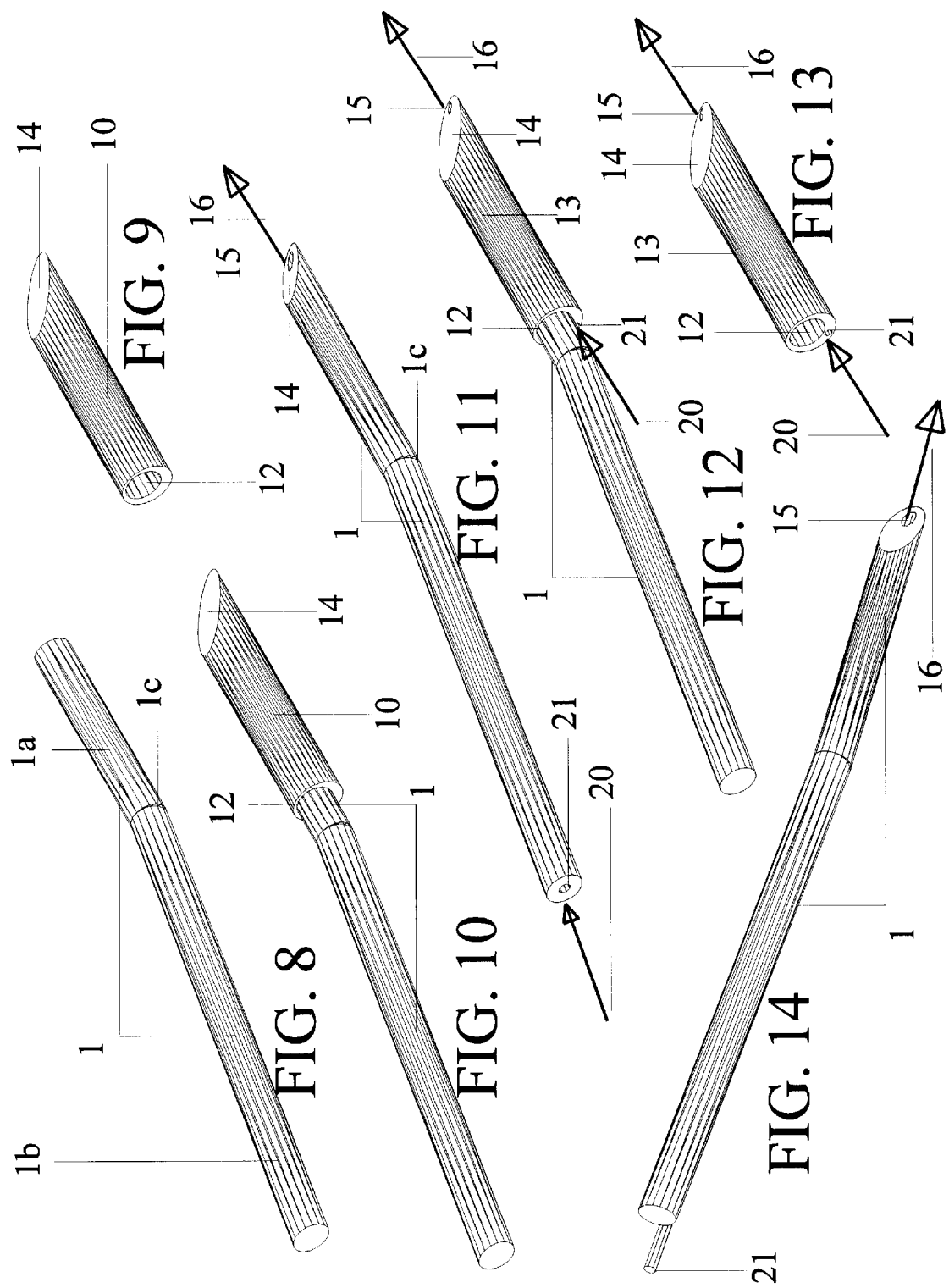

GROUND SURFACE CROP HARVESTER AND HARVESTING METHOD

CROSS-REFERENCE TO RELATED APPLICATIONS

None.

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

The gathering of the desirable parts of field crops in the harvesting process is usually performed by hand, with the exception of some onion and potato crops which may be harvested by machine. Such machines generally fall into the category of grabbers, such as the green onion harvester which is the subject of U.S. Pat. No. 3,989,110, and the category of diggers, such as in the case of potato harvesters. Other harvesting machines for field crops are simply processing machines which perform operations on the crop-parts after they are gathered by hand, such as the tomato harvester which is the subject of U.S. Pat. No. 6,033,035, the vegetable harvester which is the subject of U.S. Pat. No. 4,753,296, and the harvesting machine having blower damage prevention means which is the subject of U.S. Pat. No. 5,024,278. Otherwise, field crops are harvested by hand with the severance of the desirable part of the plant from the remainder of the plant which remains fixed to the soil.

The present invention does not dig in the soil to loosen and collect the crop plants and does not pull the plants by their tops, as in the case of other mechanical harvesters, but lifts the desirable parts of the crop from the soil in a process which either uproots the entire plant or allows for severance of the desirable crop-part from the part of the plant which remains attached to the soil. Thus, the present invention eliminates the hand labor in the crop gathering operation of harvesting, is gentler in the handling of crop-parts, and is less likely to damage crop-parts than current machine harvesting while operating at a higher speed.

The closest resemblance of the present invention to common devices is with the table fork or pitch fork, and certain heavy equipment uses, such as front end loaders and bulldozers equipped with rakes. The former of these devices are used primarily for spearing material, or digging through matted material and soil. The latter of these devices are designed to rake soil or push debris across the soil. None of these devices use forward motion under the desirable parts of crop plants to lift them from the soil and gather them by ramping them up an incline for gentle removal from the soil.

The present invention has elements that are covered generally by current United States Class 171, and International Class AO1D 23/04.

BRIEF SUMMARY OF THE INVENTION

The present invention is an apparatus for harvesting ground surface crops, and includes a method for the use of the apparatus. The apparatus includes an array of crop-lifter bars, which are connected to the top of one or more cross-members. Each bar has an obtuse-angulation toward the front end of the bar. The front parts of the bars and the back parts of the bars are aligned in arrays to describe surfaces which may be curved or substantially planar on either side of the obtuse angle. The obtuse-angulation of the bars may be a gradual bend in the bars as well as an abrupt angulation. The bars are connected to the tops of the cross-members so that they are spaced closely enough to be smaller than the size of the parts of the plants of the ground surface crop to be harvested.

The crops which may be harvested with the apparatus include onions, lettuce, cabbage, or any other ground surface crop that may be lifted and held above the soil. The bars of the array, however, should be spaced far enough apart to permit weeds and other debris to drop between the bars to the ground. Such connection of the back parts of the bars to a cross-member must be far enough to the back so that the cross-member will not interfere with the movement of the bars through the soil. To aid in the movement of the bars through the soil surface, the bars may have forward-downward-sloping chisel faces.

The normal orientation of the harvester in use is with the fronts of the bars parallel to the ground surface, and the parts of the bars behind the obtuse angles inclined upward and rearward from the vertices of the obtuse angles. The harvester apparatus is used by moving it forward, front end first, along the ground sufficiently into the soil surface to slip underneath the crop-parts to be gathered. The elevation of the front part of the bars in the surface of the soil may be controlled with guide wheels attached to the harvester which can adjustably maintain the proper depth of the bars as they move through the soil surface.

As the front parts of the bars slips underneath the crop-part to be gathered, the crop-part is lifted from the soil by the forward motion of the harvester onto the front first parts of the bars. Upon reaching the angulation, the forward motion of the harvester causes the crop-parts to be ramped upward along the rearward upward incline of the bars, and are thereby detached from the soil surface.

Upon arriving at the upper end of the rearward incline of the bars, or at some other lower point on the array of bars, the crop-parts may be dumped into a trough or otherwise transferred to a conveyor or other means of moving the crop-parts for transport to bins or other containers.

Moving the apparatus which is the present invention forward through the soil to gather the crop-parts may be accomplished by pushing the array of bars through the surface of the crop bed with a machine, such as an appropriately modified front loader, or mounted on an appropriate carriage frame, wheeled or otherwise, and pulled through the soil in the same directional orientation. To assist the bars in moving through the soil, and to assist in loosening the crop-parts from the soil each bar may include a conduit for compressed gas along all or part of the length of the bar.

BRIEF DESCRIPTION OF THE DRAWINGS

FIG. 8 is a perspective view of the front end of a crop-lifter bar with a front first part of the bar at an obtuse angle to the second part of the bar.

FIG. 9 is a perspective view of a replaceable tip for the front end of the front first part of a crop-lifter bar.

FIG. 10 is a perspective view of the front end of a crop-lifter bar with a front first part fitted with a replaceable tip with a forward-downward-sloping chisel face.

FIG. 11 is a perspective view of the front end of a crop-lifter bar which is bored for a compressed gas channel.

FIG. 12 is a perspective view of the front end of a crop-lifter bar fitted with a replaceable tip on the front part which has been bored for a compressed gas channel.

FIG. 13 is a perspective view of a replaceable tip for the front first part of a crop-lifter bar which has been bored for a compressed gas channel, and which has a forward-downward-sloping chisel face.

FIG. 14 is a perspective view of the front end of a crop-lifter bar which has been bored for a compressed gas channel fitted with a supply tube for feeding the compressed gas channel.

DETAILED DESCRIPTION OF THE INVENTION

Figure 1:
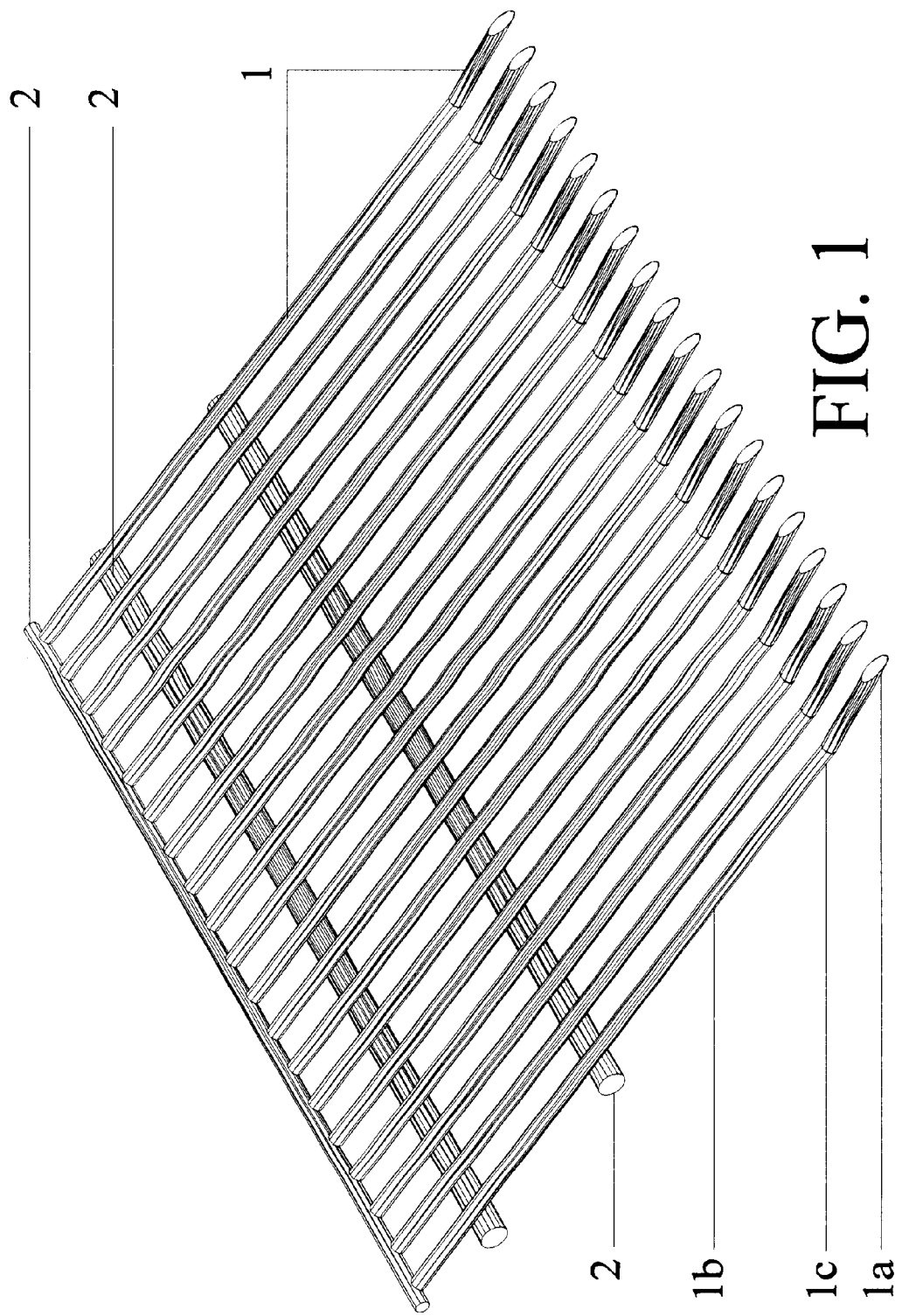
FIG. 1 is a perspective view of the crop-lifter bars attached to cross-members forming the array of bars of the harvester according to the invention.
Figure 2:
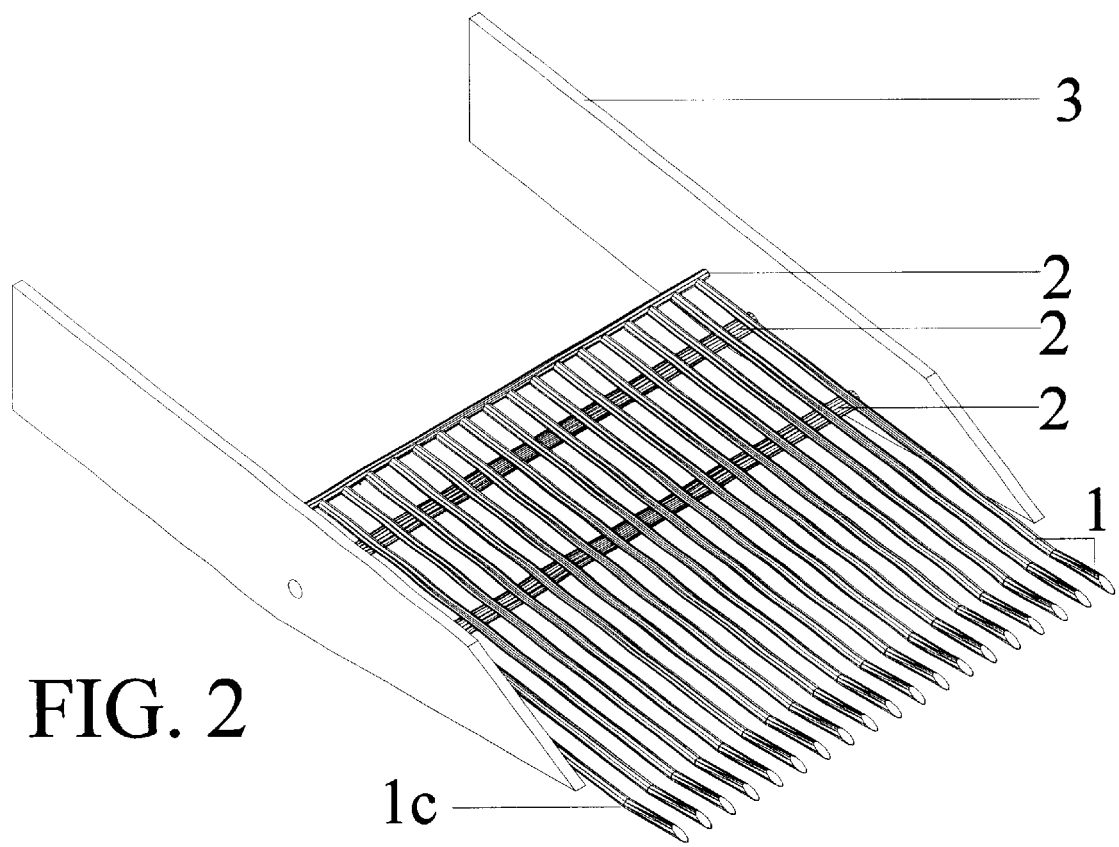
FIG. 2 is a perspective view of the array of crop-lifter bars shown in FIG. 1 with side retaining walls.
Figure 3:
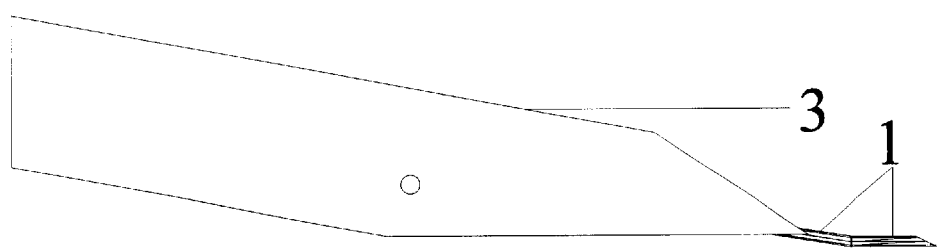
FIG. 3 is a side view of the array of crop-lifter bars with side retaining walls as shown in FIG. 2.

The present invention is an apparatus for harvesting ground surface crops, and includes a method for the use of the apparatus. As shown in FIG. 1, the apparatus, which may hereinafter be referred to as the "harvester" or the "harvester apparatus", includes an array of crop-lifter bars 1, some or all of which may be solid bars, tubes, pipes, or a combination of solid, tube and pipe, or have other structure, such as a box truss, which are connected to the top of one or more cross-members 2. The connection to the top of a cross-member holds the crop-lifter bars evenly spaced and in alignment. Such crop-lifter bars 1 may hereinafter be referred to as lifter bars 1, or simply as bars 1. Each bar 1 has an obtuse-angulation 1c toward one end of the bar, that end being the front end of the bar and the other end of the bar being the back end of the bar. The part of a bar between the front end of the bar and the vertex of the obtuse angle shall hereinafter be referred to as the front first part 1a of the bar, and the part of a bar immediately toward the back of the bar at the vertex of the obtuse angle shall be referred to as the second part 1b of the bar. In the embodiment shown in FIG. 1 the front first parts of the bars and the second parts of the bars are shown as substantially straight, so that the array of bars is substantially planar in front of the obtuse angle 1c and substantially planar toward the back of the obtuse angle 1c. The planes of the arrays thus formed are thus also at an obtuse angle 1c to one another. However, the front first parts of the bars may be curved as may be the remaining parts of the bars, and also operate with the function of the harvester disclosed herein. Also, the obtuse-angulation of the bars may be a gradual bend in the bars 1 rather than an abrupt angulation of the bars 1. The bars 1 in the array are connected to the tops of the cross-members 2 so that the path along the tops of the bars rearward is unobstructed along their length. This may be accomplished by welding, gluing, pinning, screwing, or any other form of connection which firmly holds the bars together in the configuration of the array, such as fabricated cross-couplings that do not obstruct the path along the tops of the bars.

Figure 6:
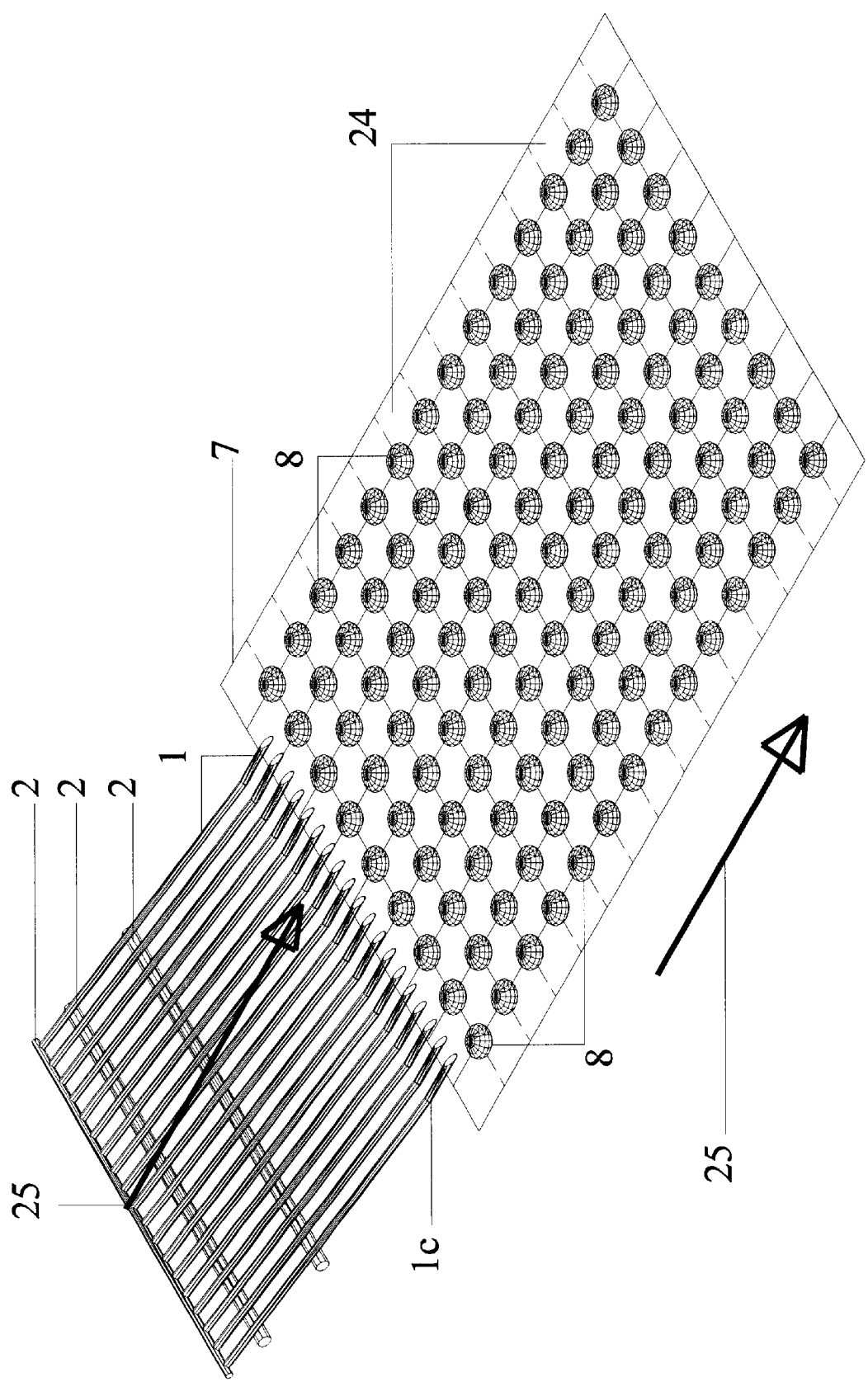
FIG. 6 is a perspective view of the array of crop-lifter bars as shown in FIG. 1 poised to gather crop-parts from a ground surface crop.
Figure 7:
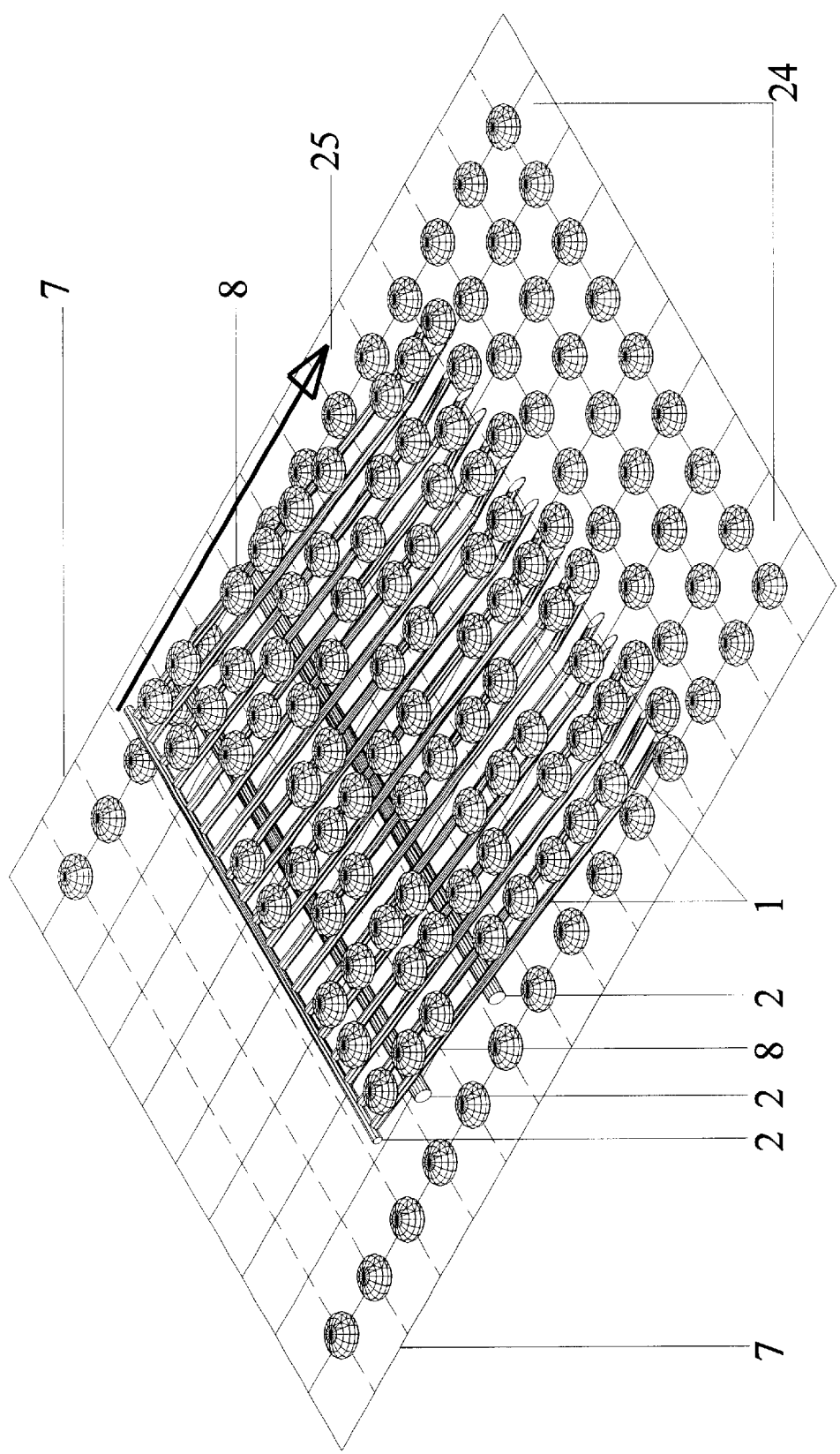
FIG. 7 is a perspective view of the array of crop-lifter bars as shown in FIG. 1 in the process of gathering crop-parts from a ground surface crop.

As shown in FIGS. 6 and 7 the bars 1 are connected to the tops of the cross-members 2 so that they are spaced closely enough to be smaller than the size of the parts of the plants of the ground surface crop to be harvested, such parts being hereinafter referred to as the crop-parts 8. The term crop-part 8 shall hereafter be used herein to mean that part of the plant which is considered to be the desired product of the crop, although plant structures which are normally not associated with the desired product of the crop, such as roots, vines, stalks, etc., and which are usually separated from the desired product of the crop by processing during or after harvest, may still be attached. The bars 1 of the array are spaced more closely than the size of the crop-parts 8 in order to be able to hold the crop-parts 8 on top of the array while the bars lift the crop-part 8 from the soil surface 7. The crops which may be harvested with the apparatus include onions, lettuce, cabbage, or any other ground surface crop that may be lifted and held above the soil surface 7 by the bars 1 of the array. The bars of the array, however, should be spaced far enough apart to permit weeds and other debris to drop between the bars to the ground. There is no direct connection between the front first parts 1a of the bars of the array. The bars are connected to one or more cross-members 2 only by connection of the second parts 1b of the bars 1 to the one or more cross-members 2. Such connection of the second parts 1b of the bars 1 to a cross-member 2 must be far enough to the back of the second parts 1b of the bars 1 so that the cross-member 2, which is below the bars 1, will not interfere with the movement of the bars 1 through the soil. To aid in the movement of the bars 1 through the soil surface 7 the bars 1 may have forward-downward-sloping chisel faces 14, as shown in FIG. 11. Such a chisel faces 14 also assists in the slipping of the bar 1 underneath the crop-parts 8 and the lifting of the crop-parts 8 onto the front first part 1a of the bar 1.

In the embodiment shown in FIG. 1 each bar 1 is substantially the same as all of the other bars in length and shape, and is obtuse angled 1c at approximately 170 degrees at a distance of 6 to 12 inches from its front end. However, with respect to the length of the front first part, other embodiments are possible where the front first part of each of said bars is sufficient in length to prevent the bars from digging down into the soil so as to cause a downward loading which is also in opposition to the motion of the harvester apparatus. Additionally, with respect to the obtuse angle, other embodiments are possible where the obtuse angle of each bar is greater than one hundred thirty-five (135) degrees, and sufficiently less than a straight angle, so that the cross-members do not touch the soil, and so that there is sufficient distance between the soil and the bars to allow clearance for components for collecting, transporting, and separating unwanted plant parts from the crop-parts. Each of the bars 1 may also be constructed with an adjustable joint between the front first part 1a and the second part 1b so that the obtuse-angulation 1c of the bar 1 is adjustable. Such an adjustable joint may also be actuated for control during the operation of the harvester.

Figure 4:
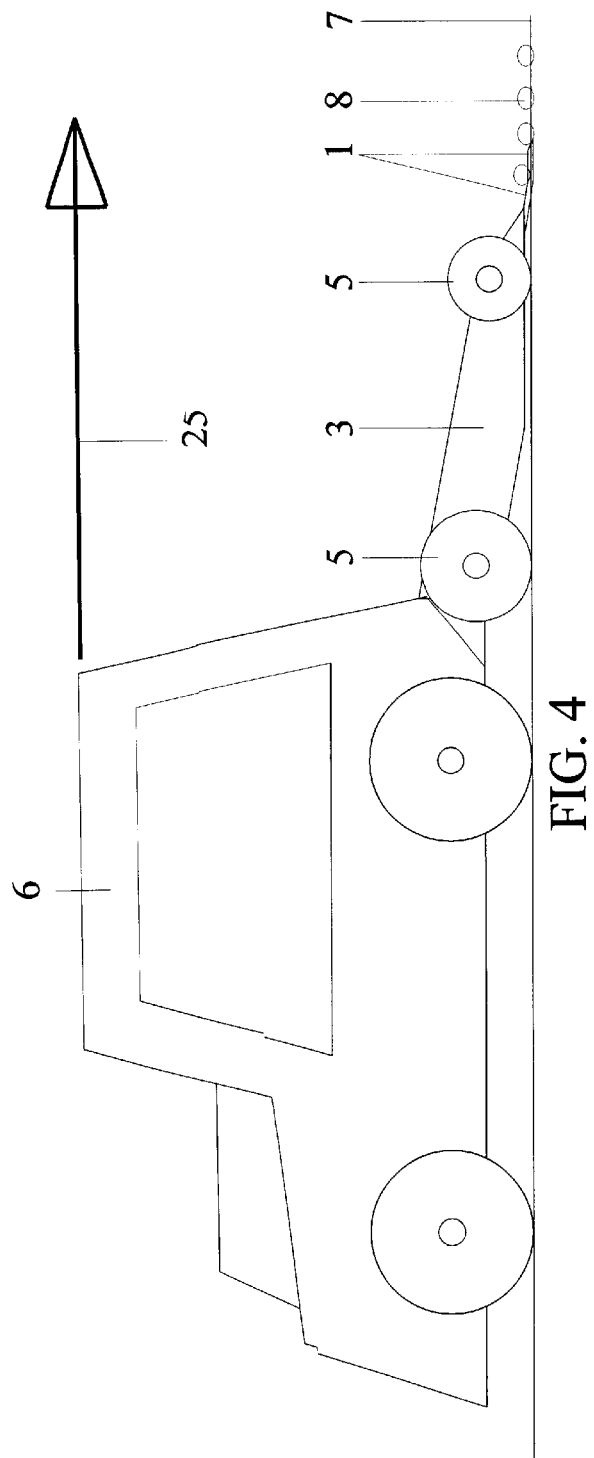
FIG. 4 is a schematic side view of the crop-lifter bars with side retaining walls shown in FIG. 2, but with guide wheels, attached for driving to the front end of a tractor.
Figure 5:
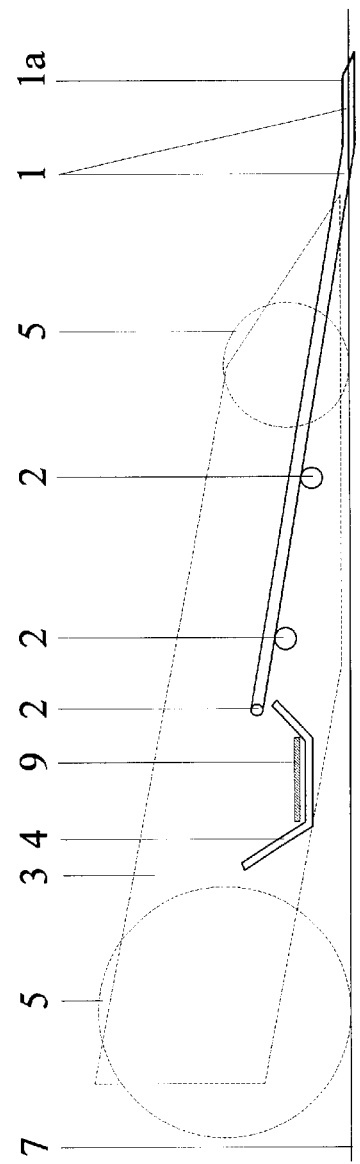
FIG. 5 is a side view of the array of crop-lifter bars shown in FIG. 1 in relation to a trough with a conveyor, the side retaining walls and guide wheels being as shown as in FIG. 4, but as transparent with dotted lines.

The normal orientation of the harvester in use is with the front first parts 1a of the bars 1 substantially parallel to the ground surface 7, and the second parts 1b of the bars 1 rearwardly and upwardly inclined from the vertices 1c of the obtuse angles between the front first 1a parts and the second parts 1b. As shown in FIGS. 6 and 7 the harvester apparatus is used by moving it forward 25, front end first, along the ground 7, with the front first parts 1a of the bars sufficiently into the soil surface 7 to slip underneath the crop-parts 8 to be gathered without significant damage to the crop-parts 8. The elevation of the front first part 1a of the bars 1 in the surface of the soil may be controlled with guide wheels 5 attached to the harvester, as shown in FIGS. 4 and 5, which can adjustably maintain the proper depth of the bars as they move through the soil surface. Adjustably maintaining the proper depth of the bars may also be accomplished with other hydraulic, electric, or mechanical devices incorporated with a tractor source of motive power, such as those used to drive the bucket or rake of a front end loader. Control of such adjustment may be automated by feedback from sensors that measure parameters of the soil, such as resistance to motion, density, and moisture, or sensors which measure the forces operating in the harvester and the systems that provide power for its operation, such as strain sensors in the apparatus itself, or pressure sensors in the guide wheels or power linkage.

As the front first parts 1a of the bars slips underneath the crop-part 8 to be gathered, the crop-part 8 is lifted from the soil by the forward motion of the harvester onto the front first parts 1a of the bars 1. While the crop-parts 8 retain connection with the soil, the forward motion 25 of the harvester also causes the crop-parts 8 to move rearward relative to the harvester, toward the angulation 1c, while remaining substantially stationary relative to the soil surface 7. Upon reaching the angulation 1c, the forward motion of the harvester causes the crop-parts 8 to be ramped upward along the rearward upward incline of the second parts 1b of the bars 1, and are thereby detached from the soil surface 7, either by uprooting or other breaking or severing of structures which are part of the growing plants of the crop. As shown in FIG. 7, once detached from the soil, the movement of the crop-parts 8 rearward along the bars 1 may also occur as a result of an accumulation of other crop-parts 8 on the bars 1 which are pushing backward against each other as the harvester travels forward 25 and engages more crop-parts attached to the soil. Retaining the crop-parts 8 on the top of the bars separated from the soil may be accomplished by side retaining walls 3 aligned with the bars 1 on either side of the array, which are shown in FIGS. 2–5.

The crop-parts 8 may be assisted in their travel upward along the rearward upward incline of the bars 1 by mechanical means, such as blowers, conveyors, or paddle wheels above the bars 1. The array of crop-lifter bars 1 of the harvester is shown in FIG. 5 in relation to a trough 4 with a conveyor 9, the side retaining walls 3 and guide wheels 5 being shown in relation to the bars 1 as transparent with dotted lines.

Upon arriving at the upper end of the rearward incline of the bars 1, or at some other lower point on the array of bars, the crop-parts 8 may be dumped into a trough 4 or otherwise transferred to a conveyor 9 or other means of moving the crop-parts 8 for transport to bins or other containers. Such bins or containers may be mobile, such as those on trailers, wagons, or trucks. The transport of the crop-parts 8 may also be to a vehicle which is equipped for processing the crop-parts 8, such as with additional devices for removing roots or tops. The apparatus itself may also be fitted with components for collecting and transporting crop-parts, and separating unwanted plant parts from the crop-parts.

Moving the apparatus which is the present invention forward through the soil to gather the crop-parts 8 may be accomplished by pushing the array of bars 1 through the surface of the crop bed 24 with a machine, such as an appropriately modified front loader 6, as shown in FIG. 4, or mounted on an appropriate carriage frame, wheeled or otherwise, and pulled through the soil in the same directional orientation. The present invention may also be used with current art harvesters, particularly those without a gathering apparatus, such as disclosed in Shuknecht et al, U.S. Pat. No. 5,024,278, in place of any digging or raking apparatus they may incorporate, with the present invention leading the motion of the harvester through the crop. Such tractor power 6 for pushing and pulling the harvester according to the present invention may also incorporate electrically, mechanically, or hydraulicly powered devices for lifting the harvester from the ground for maneuvering and alignment with crop rows or beds in the crop plot 24.

The bars 1 may be of any cross-sectional shape, but the preferred cross-sectional shape is one which does not cause the bar to have sharp angular edges along its length, such as a circle, ellipse, or polygon with rounding at the vertices, in order to avoid damage to the plants by indentation or cutting.

The bars 1 may be equipped with replaceable tips 10 for the front end of the bars 1, as shown in FIGS. 8–10, so that wearing of the fronts ends of the bars 1 themselves by the motion through the soil can be avoided. Such replaceable tips may also be resilient and flexible to avoid damage to the crop-parts 8 as they are encountered by the bars 1 in their forward motion 25 through the soil surface 7, and may have a forward-downward-sloping chisel faces 14, as shown in FIGS. 9, 10, 12, and 13.

The preferred embodiment of the present invention is such that each bar 1 includes a conduit 21 for compressed gas along all or part of the length of the bar 1, such a conduit 21 being either within the bar, such as a boring or the channel of a tube as in FIGS. 11 and 14, or attached to the bar, such as through a replaceable tip as in FIGS. 12 and 13, so that compressed gas 16 may be forced out of an orifice 15 in or near the front face 14 of a bar 1 or its replaceable tip 13 in the general direction 25 of motion of the front first part 1a of the bar 1 through the soil surface 7. The purpose of forcing compressed gas 16 out of or near the face of the bars 1, or its replaceable tip 13, in the direction of motion 25 of the bar 1 through the soil surface 7 is to cushion the contact of the bar 1, or its replaceable tip 13, with the crop-parts 8 to avoid damage to the crop-parts 8, to assist the bars 1 in moving through the soil, and to assist in loosening the crop-parts 8 from the soil. In addition to being in the general direction 25 of the motion of the bar 1 through the soil, the direction of the compressed gas jet 15 may also be angled slightly upward to enhance the lifting effect on the crop-parts 8.

While the invention has been disclosed in some of its embodiments, it will be understood that there is no intention to limit the invention to any of the particular embodiments shown, but it is intended to cover the various alternative and equivalent constructions included within the spirit and scope of the appended claims which are demonstrated by the embodiments and their variations.

What I claim as my invention is:

1. An apparatus for harvesting ground surface crops comprising:
   (a) a plurality of bars each of which is bent in the front half thereof in at least one place with an obtuse angle, each having a front first part and a second part, the front first part being in front of the obtuse angle and the second part being in back of the obtuse angle;
   (b) one or more cross-members to which the second part of each bar is connected with spacing between adjacent bars, such spacing between adjacent bars being smaller than the size of the crop-parts being harvested, so that the crop-parts do not fall through the spaces between adjacent bars; and (c) one or more means for adjustably maintaining the proper depth of the front first parts of said bars as they move through the soil surface; wherein none of the front first parts of said plurality of bars are connected to anything to which the front first part of another of said plurality of bars are connected to anything to which the front first part of another of said plurality of bars is connected;

wherein the second part of each of the bars inclines rearwardly upward from the vertex of the obtuse angle of the bar when the front first part of the bar is in a substantially horizontal orientation; and wherein moving said bars forward along and through the soil surface in a direction substantially parallel to the front first parts of the bars slides the bars underneath the crop-parts, thereby lifting the crop-parts in rearward motion relative to the bars, and sufficiently ramps the crop-parts upward along the rearward incline of the bars so that the crop-parts are detached from the soil.

2. The apparatus for harvesting ground surface crops of claim 1 wherein the front first parts of said bars are held oriented at substantially the same level along said bars, and the second parts of said bars are held oriented at substantially the same level along said bars.

3. The apparatus for harvesting ground surface crops of claim 1 wherein the front first parts of said bars are held substantially parallel to each other, and the second parts of said bars are held substantially parallel to each other.

4. The apparatus for harvesting ground surface crops of claim 1 wherein said plurality of bars are moveable along and through the soil surface without said one or more cross-members touching the soil surface.

5. The apparatus for harvesting ground surface crops of claim 1 wherein said bars are sufficiently separated to allow soil and debris to drop between them.

6. The apparatus for harvesting ground surface crops of claim 1 wherein said bars are of approximately the same length.

7. The apparatus for harvesting ground surface crops of claim 1 wherein the front first part of each of said bars is sufficient in length to prevent said bars from digging down into the soil so as to cause a downward loading which is in opposition to the motion of the apparatus.

8. The apparatus for harvesting ground surface crops of claim 1 wherein the obtuse angle of each of said-bars is greater than one hundred thirty-five (135) degrees and sufficiently less than a straight angle, so that said one or more cross-members do not touch the soil, and so that there is sufficient distance between the soil and said bars to allow clearance for components for collecting and transporting crop-parts.

9. The apparatus for harvesting ground surface crops of claim 1 wherein the front end of the bars is a forward-downward-sloping chisel face.

10. The apparatus for harvesting ground surface crops of claim 1 wherein said bars do not have any sharp angular edges.

11. The apparatus for harvesting ground surface crops of claim 1, further comprising means for assisting the upward and rearward movement of the crop-parts on the upward incline of said bars.

12. The apparatus for harvesting ground surface crops of claim 1, further comprising sensors that measure soil parameters providing information for control of said means for adjustably maintaining the proper depth of the front first parts of said bars.

13. The apparatus for harvesting ground surface crops of claim 1 wherein one or more of said bars includes a conduit for compressed gas with a discharge point for such compressed gas substantially at the front end of said one or more of said bars.

14. The apparatus for harvesting ground surface crops of claim 1, further comprising a supply of compressed gas; and one or more of said crop-lifter bars with a conduit for the compressed gas with a discharge point for such compressed gas substantially at the front end of said one or more of said bars, so that compressed gas in the conduit is forced out of the conduit substantially at the front ends of said one or more of said bars in a direction substantially within the vertical plane of the direction of motion of the apparatus through the soil.

15. The apparatus for harvesting ground surface crops of claim 1, further comprising replaceable tips on the front ends of said bars.

16. The apparatus for harvesting ground surface crops of claim 1, further comprising side retaining walls aligned with said bars on both sides of the array of said bars.

17. The apparatus for harvesting ground surface crops of claim 1, wherein at least one of the means for adjustably maintaining the proper depth of the front first parts of said bars is comprised of guide wheels which are connected to the apparatus to control the depth in the soil surface at which the front first parts of said bars travel forward through the soil surface.

18. A method for harvesting ground surface crops using the apparatus of claim 1, comprising the steps of:

moving said apparatus of claim 1 on the surface of the soil along the crop rows in a direction substantially parallel to the front first parts of each of said bars so that the front first parts of said bars slide under the crop-parts to be harvested;

moving the crop-parts along said bars rearward to the obtuse-angulation of said bars by the continued forward motion of said apparatus along the crop rows;

ramping the crop-parts upward along the rearwardly upward incline of the second parts of said bars with the continuing motion of said apparatus along the crop rows, whereby the crop-parts are detached from the soil.

19. The method of claim 18 further comprising the additional subsequent step of mechanically assisting the movement of the crop-parts in ramping up the second parts of said bars.

20. The method of claim 18 further comprising a final operation of conveying the crop-parts off the apparatus into containers.

21. An apparatus for harvesting ground surface crops comprising:

(a) a plurality of bars each of which is bent in the front half thereof in at least one place with an obtuse angle, each having a front first part and a second part, the front first part being in front of the obtuse angle and the second part being in back of the obtuse angle; and (b) one or more cross-members to which the second part of each bar is connected with spacing between adjacent bars, such spacing between adjacent bars being smaller than the size of the crop-parts being harvested, so that the crop-parts do not fall through the spaces between adjacent bars; wherein the second part of each of the bars inclines rearwardly upward from the vertex of the obtuse angle of the bars when the front part of each of the bars is in a substantially horizontal orientation; wherein one or more bars includes a conduit for compressed gas with a discharge point for such compressed gas substantially at the front end of said one or more bars, which produces a compressed gas jet in a direction substantially forward from the front end of the bar in the vertical plane including the front end of the bars to cushion the contact of the front ends of the bars with the crop-parts; and wherein moving the bars forward along and through the soil surface, in a direction substantially parallel to the front first parts of the bars, slides the bars underneath the crop-parts, thereby lifting the crop-parts in rearward motion relative to the bars, and sufficiently ramps the crop-parts upward along the rearward incline of the bars so that the crop-parts are detached from the soil.

* * * * *